May 8, 1934.  A. W. GELPCKE  1,957,533

BOLT ANCHOR

Filed April 5, 1932   3 Sheets-Sheet 1

INVENTOR-
ALFRED W. GELPCKE
BY
A. D. T. Libby
ATTORNEY-

May 8, 1934. A. W. GELPCKE 1,957,533
BOLT ANCHOR
Filed April 5, 1932 3 Sheets-Sheet 2

INVENTOR-
ALFRED W. GELPCKE
BY
A. D. T. Libby
ATTORNEY-

May 8, 1934.  A. W. GELPCKE  1,957,533
BOLT ANCHOR
Filed April 5, 1932   3 Sheets-Sheet 3

INVENTOR-
ALFRED W. GELPCKE
BY
*A. D. T. Libby*
ATTORNEY-

Patented May 8, 1934

1,957,533

UNITED STATES PATENT OFFICE 1,957,533

BOLT ANCHOR

Alfred W. Gelpcke, Brooklyn, N. Y., assignor to
The Rawlplug Company, Inc., New York, N. Y.

Application April 5, 1932, Serial No. 603,286

19 Claims. (Cl. 72—105)

This invention relates to the design of bolt-anchors used for fastening fixtures to brick, concrete, or other masonry. In order to fasten the bolt in place, a hole must be drilled into the structure into which the bolt is to be set and the anchor must be of a size to fit the hole, and must be capable of being expanded into gripping relation with the walls of the hole so that the bolt is securely held in position. Many designs of bolt-anchors have been heretofore proposed, one such being the form shown in my Patent 1,852,297, issued April 5, 1932.

The principal object of my present invention is to provide various designs in which the advantages of construction of the aforesaid patent may be attained.

Other and ancillary objects will present themselves to one familiar with bolt anchors on reading the specification taken in connection with the drawings forming a part thereof. In the drawings:

Figure 3 is a view similar to Figure 1, but showing a modification thereof.

Figure 9 shows a further modified form of bolt-anchor in which the end-flanges are tapered toward the bolt-hole.

Figure 1:
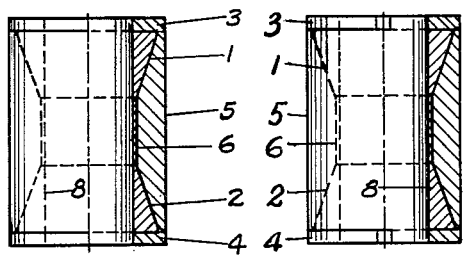
Figure 1 shows a part-elevational and part-sectional view of one form of my present invention.

Referring now to the details wherein like numbers refer to corresponding parts in the various views, 1 and 2 are end-members having flanges 3 and 4 respectively. The members 1 and 2, together with their flanges, are preferably conical in shape and of relatively rigid material as compared with the central intermediately-positioned member 5 which is of expansible material such as lead. The end-portions or sections 1 and 2 are joined by a section or part 6 which is relatively thin so that this section will readily collapse by blows applied to either of the flanges 3 and 4, depending on which way the anchor is put into the hole. Preferably, the end-portions 1 and 2 are made of a metal that is ductile and malleable, and since aluminum possesses both of these properties, I have found it highly advantageous to make the spool or frame member previously described out of aluminum.

Figure 13:
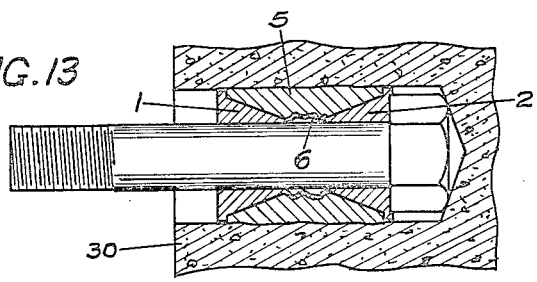
Figure 13 shows generally any one of the anchors heretofore described, set in position in a section of masonry.

After the spool has been made by preferably casting the same, the expansible material 5 is then moulded around the spool, thereby providing a unitary reversible bolt-anchor as described in my patent previously referred to. However, in the present form, I have provided, as shown more particularly in Figure 2, a pair of slots 7 which extend from the inner periphery of the hole 8 in the anchor to the outer periphery of the flanges, the object of these slots or notches being to insure that the flanges will spread sufficiently to fill the hole in the masonry and assist in gripping the same, and at the same time prevent the expansible material 5 from passing outwardly beyond the top flange. When this anchor is put in position and calked, it presents a final appearance about as shown in Figure 13, where a bolt is installed in concrete 30.

Figure 2:
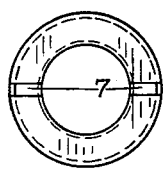
Figure 2 is an end-view of Figure 1.
Figure 4:
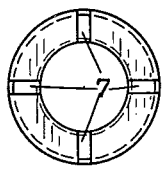
Figure 4 is an end-view of Figure 3.

In Figures 3 and 4, the anchor is provided with four notches 7 instead of two as shown in Figures 1 and 2. Otherwise, the construction is the same.

Figure 5:
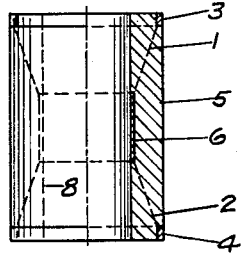
Figure 5 is a view similar to Figure 1, showing a still further modified form of bolt-anchor.
Figure 6:
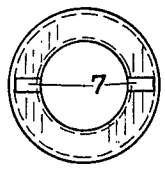
Figure 6 is an end-view of Figure 5.

In Figures 5 and 6, a pair of notches similar to those shown in Figure 2 are indicated, but these notches do not extend to the outer periphery of the flanges, but on the contrary, extend longitudinally through the cone-members 1 and 2, thereby allowing the cones themselves to better expand under the calking blows to spread the expansible member 5.

Figure 7:
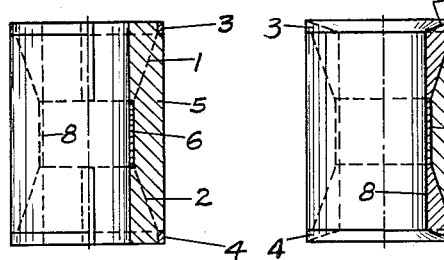
Figure 7 is a view similar to Figure 5, but a slightly modified form thereof.
Figure 8:
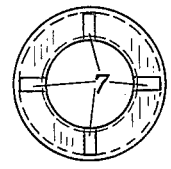
Figure 8 is an end-view of Figure 7.

In Figures 7 and 8, the construction is the same as in Figures 5 and 6, except that four slots 7 are indicated.

Figure 11:
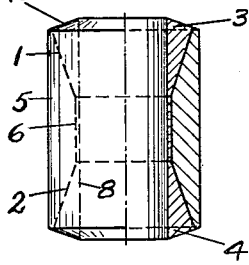
Figure 11 is a form of anchor in which the flanges are tapered in the opposite direction to that shown in Figure 9.
Figure 10:
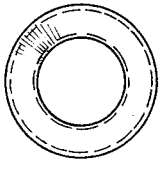
Figure 10 is an end-view of Figure 9.
Figure 12:
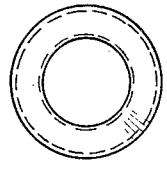
Figure 12 is an end-view of Figure 11.

In Figures 9 and 10, the flanges 3 and 4 are beveled at 9 inwardly toward the hole 8, while in Figures 11 and 12 the bevel 10 extends outwardly.

Figure 14:
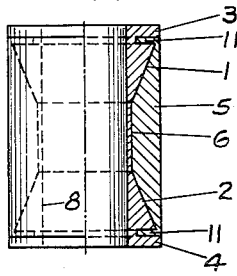
Figure 14 shows a still further modified form of anchor and has an annular space between the flanges of the cone-shaped members, this space being filled with expansible metal.
Figure 15:
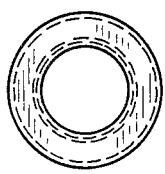
Figure 15 is an end-view of Figure 14.

In the form shown in Figures 14 and 15, a groove 11 is provided at the junction of each cone and its flange, and the expansible metal 5 is moulded within these annular grooves 11.

Figure 16:
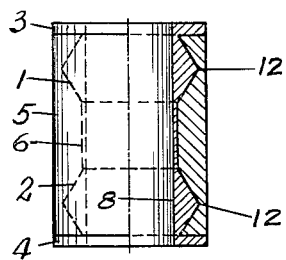
Figure 16 shows a form of bolt-anchor in which a pair of double cones are used at each end of the anchor, the cones being enclosed by the expansible material.

In Figure 16, the members 1 and 2 are double cone-shaped or frustums thereof, meeting along the common base line 12. As in the previous forms, the inner cones are connected by the collapsible member 6, so that blows on either of the flanges 3 or 4 will force the double cone-shaped members 1 and 2 through the collapsible material 6 at the points 12, or into gripping relation with the sides of the hole; and likewise, will force the expansible material 5 into contact with the walls of the hole.

Figure 17:
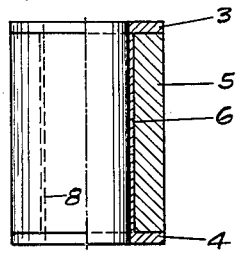
Figure 17 shows a form of anchor in which any part of the spool between the flanges is collapsible, the space between the flanges being entirely filled with expansible material.

In Figure 17, the expansible material 5 forms a cylindrical surface around the thin section 6. In this form, the lead 5 is forced by the flanges 3 and 4 into contact with the walls of the hole.

Figure 18:
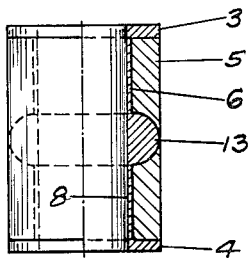
Figure 18 is a view somewhat like Figure 17, but carries the insertion of a bridge located between the flanges or ends of the anchor.

Figure 18 is similar to Figure 17, except that there is a central rigid section 13 of metal similar to the rest of the frame or spool. These surfaces are arcuate in form so as to allow the expansible material 5 to slide over the rounded surface and contact with the wall of the hole.

Figure 19:
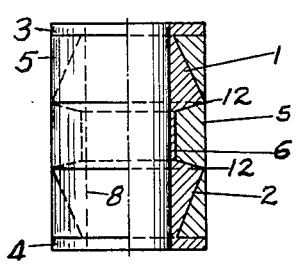
Figure 19 shows a construction somewhat like that shown in Figure 16, but the cones being a little differently shaped.

In Figure 19, the expanding members 1 and 2 are in the shape of double cones or frustums thereof, meeting at the common base line 12, but the inner cones, connected to the collapsible section 6, are very small in volume as compared with the outer cones which extend to the flanges 3 and 4.

Figure 20:
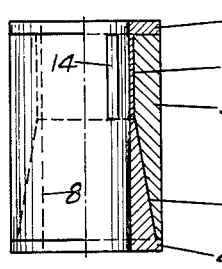
Figure 20 shows a form in which a single long, rigid cone member is used at one end of the anchor.

In Figure 20, only one expanding member 2 is shown, but this is made with a long taper terminating in the collapsible section 6, which section is also provided with slots 14 to further weaken the section, whereby it will readily collapse, all as explained in my patent previously referred to.

Figure 21:
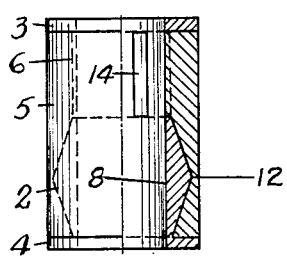
Figure 21 shows a construction somewhat like that in Figure 20, but with double cones used at one end.

In Figure 21, the expanding member 2 is made in a double conical shape, the cones meeting on the line 12 as in some of the previous forms. Otherwise, the construction is the same as that shown in Figure 20.

Figure 22:
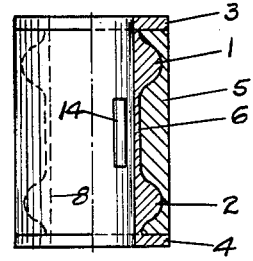
Figure 22 shows a construction somewhat like that shown in Figure 16, but in which the cones have curved surfaces instead of straight.

In Figure 22, the expanding members 1 and 2 have curvilinear surfaces instead of coming to a sharp edge 12 as indicated in Figure 16.

Figure 23:
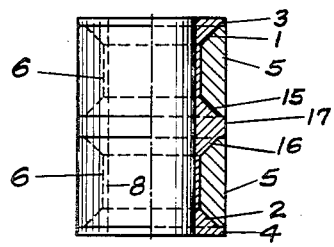
Figure 23 is a form of anchor in which the spool or frame-work is composed of cones at each end of the anchor, and a pair of double cone-members intermediate the ends.

In Figure 23, there are disposed between the end-expanding members 1 and 2, expanding members 15 and 16 joined by a solid annular section 17, and a collapsible portion 6 is disposed between these central expanding members and the end-expanding members 1 and 2. The effect of this construction is that of two united in one; that is to say, in certain prior art constructions, one bolt-anchor is calked into position and then another put in place over this and calked into position, etc., thereby giving a plurality of separate anchors. In the construction shown in Figures 23 to 26 inclusive, a similar effect is obtained by a single unitary structure which is at the same time reversible.

Figure 24:
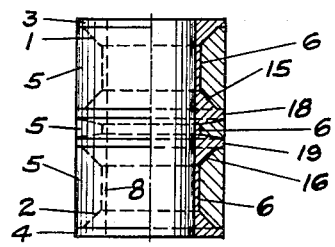
Figure 24 is a view similar to Figure 23, but in which the central cones are separated.

The anchor shown in Figure 24, is similar to that shown in Figure 23, except that the central section 17 is divided into two sections 18 and 19 separated by a narrow space connected by a short collapsible section 6, and the space filled with expanding metal.

Figure 25:
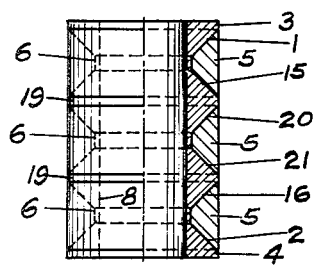
Figure 25 shows a construction similar to Figure 23, but in which a plurality of double cones are arranged intermediate the end-members.

Figure 25 shows a modification of the structures shown in Figures 23 and 24, cone-shaped surfaces 20 and 21 being used between the annular portions or flanges 18 and 19.

Figure 26:
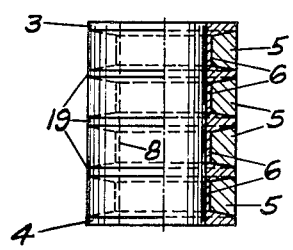
Figure 26 shows a modified form of the construction shown in Figure 25.

In Figure 26, the cone-shaped expanding members are less pronounced in the different sections, but in these later mentioned forms it is to be noted that the expanding members are substantially of the same diameter as the complete unit, and the calking operation not only drives the expansible metal into the side-walls of the hole, but the expanding members themselves are also forced into contact with the walls of the hole.

Figure 27:
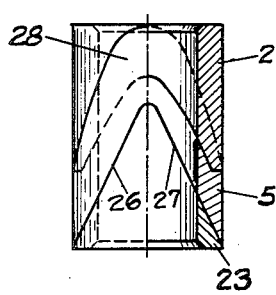
Figure 27 shows a still further modified form of bolt-anchor in which the two cone-shaped members have V portions formed therein, and these V-shaped portions are arranged in overlapping relationship.
Figure 29:
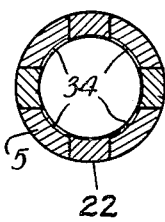
Figure 29 is a section on the line 29—29 of Figure 28.
Figure 28:
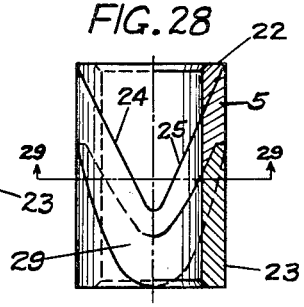
Figure 28 is a view of an anchor shown in Figure 27, but turned ninety degrees.

In Figures 27 and 28, which represent the same device, the views being taken one ninety degrees from the other, the expanding members 22 and 23 are differently constructed than in the previous figures. The member 22 is provided with wedge surfaces 28 on opposite sides, the same being bounded by the lines 24 and 25, while the member 23 has a wedge surface 29 bounded by the lines 26 and 27. These wedge-shaped surfaces are connected by thin collapsible sections 34, and then, moulded over this section as well as the wedge-shaped surfaces, is the expansible material 5, so that the calking blows on either of the members 22 or 23, depending on which way the device is put into the hole, will force the pointed ends of the members over the respective wedge-shaped surfaces 28 and 29, and will thereby force the expansible material as well as the expanding members themselves, into contact with the sidewalls of the hole.

It is to be understood that in the various forms, the collapsible sections 6 may be provided with holes or slots 14, although these openings are not shown in all of the devices described. Also, it is to be understood that the end-flanges in the different forms may be provided with cut-away portions as indicated in Figures 1 to 11 inclusive; also, the members 22 and 23 in the forms shown in Figures 27 and 28 may be provided with flanges.

Figure 30:
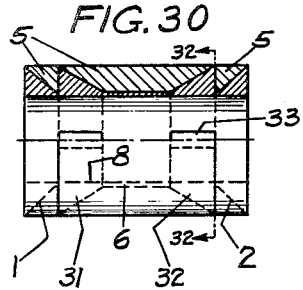
Figure 30 is a modification of the form shown in Figure 7.
Figure 31:
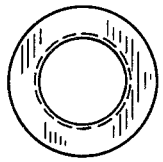
Figure 31 is an end-view of Figure 30.
Figure 32:
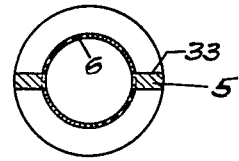
Figure 32 is a view on the line 32—32 of Figure 30.

Likewise, the form shown in Figure 30, may be provided with flanges. In this form, the frame is made up of a pair of cones at each end. The inner cones 31 and 32 are joined by the collapsible section 6, while the cones 1 and 2, or frustums thereof, have their edges of smaller diameter meeting at the junction of the bolt-hole and the bases of the cones 31 and 32 respectively, being normally sustained in this position before the lead or expansible material is cast or placed around the frame, by a thin collapsible edge of the frame material.

The cones 31 and 32 may be slotted at 33 so that blows on the cones 1 or 2 will cause the cones to spread the inner cones 31 and 32, and at the same time force them toward each other to collapse the section 6. At the same time, the expansible metal 5 is forced into engagement with the side-wall of the hole.

From what has been said, it will be apparent that the broad invention set forth in my patent previously mentioned may take other forms than those herein indicated, but the claims in this present case are directed to those forms which now appear to be to be most advantageous.

Having thus described my invention, what I claim is:

1. A bolt-anchor comprising two hollow flanged end-portions connected by an intermediate collapsible part, expansible metal positioned between said flanges and over said intermediate portion, said flanges being slotted to insure that the end-portions will expand to grip the wall of the hole during the calking operation.

2. A bolt-anchor comprising two hollow flanged cone-shaped end-portions, the cones extending toward each other and joined by a collapsible part, expansible metal positioned between said flanges and over the cones and collapsible part, said flanges being slotted to insure that the end-portions will expand to grip the wall of the hole during the calking operation.

3. A bolt-anchor as set forth in claim 2, further characterized in that the slots in the flanges do not extend to their peripheries, but do extend longitudinally into the cones.

4. A bolt anchor comprising two hollow flanged end-portions connected by an intermediate collapsible part, expansible metal positioned between said flanges and over said intermediate portion, said flanges having parts removed as and for the purposes described.

5. A bolt-anchor as set forth in claim 1, further characterized in that the said end-members are double cone-shaped.

6. A bolt-anchor as set forth in claim 1, further characterized in that the said end-members are double cone-shaped, one of said cones of each end-member being much larger in volume than the other.

7. A bolt-anchor as set forth in claim 1, further characterized in that the said end-members are double cone-shaped, one of said cones of each end-member being much larger in volume than the other, the smaller cones being joined to said collapsible part.

8. A bolt-anchor as set forth in claim 1, further characterized in that the said end-members have curvilinear surfaces extending toward the end flanges and the collapsible part.

9. A bolt-anchor comprising a plurality of rigid portions, one at each end, and at least one intermediate the end-portions and joined thereto by collapsible sections, and expansible metal extending over said collapsible sections and parts of said rigid portions.

10. A cylindrical, unitary, reversible bolt-anchor including a metal frame composed of a plurality of portions, two of which are at the ends and at least one intermediate thereof, said portions being joined by collapsible sections and readily expansible metal such as lead moulded around the frame to form a cylindrical unit.

11. A cylindrical, unitary, reversible bolt-anchor including a frame of ductile and malleable metal composed of more than two expanding portions joined by collapsible sections and readily expansible metal such as lead moulded around the frame to form a cylindrical unit.

12. A bolt-anchor as set forth in claim 11, further characterized in that said expanding portions are normally of substantially the same diameter as the finished unit.

13. A cylindrically-shaped bolt-anchor having a frame composed of two wedge-shaped members, the wedge portions normally lying in overlapping relationship, and the overlapping edges being joined by collapsible sections, and expansible metal positioned around said members.

14. A combination bolt-anchor comprising a plurality of sections each composed of a pair of expanding members two of which are end members all joined together by collapsible sections covered by expansible metal.

15. A bolt-anchor as set forth in claim 14, further characterized in that said expanding members are normally of the same diameter as the complete anchor.

16. A cylindrically-shaped unitary bolt-anchor having a hollow frame composed of a pair of conically-shaped expanding members at each end, the inner cones being pointed toward each other and joined by a collapsible section, the outer cones having their smaller diameters meeting the hole through the frame at the bases of the inner cones, and expansible metal positioned around said frame.

17. A unitary bolt-anchor as set forth in claim 16, further characterized in that the inner cones are slotted whereby they may be more readily expanded by the outer cones.

18. A unitary reversible bolt-anchor having a hollow frame including two pairs of conically-shaped expanding members arranged at opposite ends of the frame and all joined by collapsible sections, one pair of cones being expanded by blows applied to the other pair, and expansible metal carried by the frame between both sets of cones.

19. A bolt-anchor as set forth in claim 18, further characterized in that the inner pair of cones is provided with weakening means whereby they may be more readily expanded by blows applied to the outer cones.

ALFRED W. GELPCKE.